Figure 1:
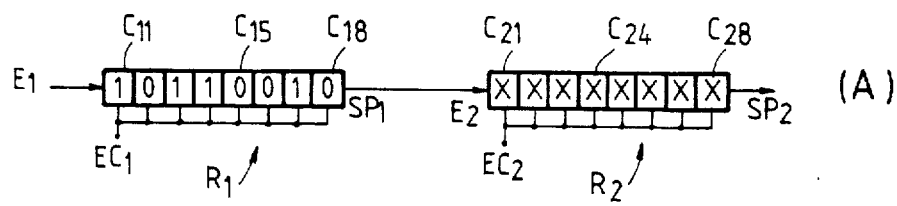
Figure 1:
Figure 1:
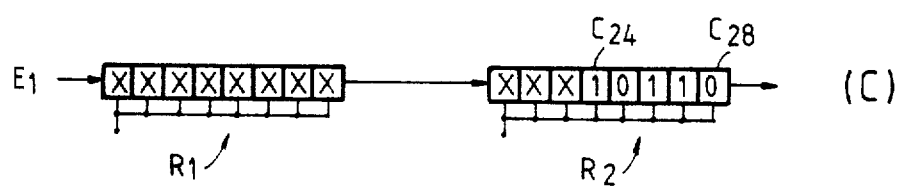

United States Patent [19]

Benkara et al.

[11] Patent Number: 4,796,225

[45] Date of Patent: Jan. 3, 1989

[54] PROGRAMMABLE DYNAMIC SHIFT REGISTER WITH VARIABLE SHIFT CONTROL

[75] Inventors: Ferial Benkara, Bagneux, France; Daniel Campbell, Palos Verdes East, Calif.

[73] Assignee: Enertec, Montrouge, France

[21] Appl. No.: 735,238

[22] Filed: May 17, 1985

[30] Foreign Application Priority Data

May 21, 1984 [FR] France ................ 84 07845

[51] Int. Cl.$^4$ .................................. G06F 7/38
[52] U.S. Cl. .......................... 365/75; 364/900
[58] Field of Search ... 364/900 MS File, 200 MS File; 365/23, 75, 78, 77; 377/64, 75, 76, 54

[56] References Cited

U.S. PATENT DOCUMENTS

| | | | |
|---|---|---|---|
| 3,156,901 | 11/1964 | Kline | 365/75 |
| 3,278,904 | 10/1966 | Lekven | 364/900 |
| 3,328,772 | 6/1967 | Oeters | 364/200 |
| 3,478,325 | 11/1969 | Oeters et al. | 364/900 |
| 3,596,187 | 7/1971 | Thompson | 377/75 |
| 3,656,122 | 4/1972 | Pasternack | 365/77 |
| 3,984,821 | 10/1976 | Locke | 365/77 |
| 4,176,400 | 11/1979 | Heckel | 364/900 |
| 4,224,531 | 9/1980 | Ebihara et al. | 377/54 |
| 4,524,455 | 6/1985 | Holsztynski et al. | 364/200 |

*Primary Examiner*—Gareth D. Shaw
*Assistant Examiner*—Debra A. Chun
*Attorney, Agent, or Firm*—Sanford J. Asman

[57] ABSTRACT

The invention relates to a shift register structure and its control. The positioning and/or synchronization of data contained in this register for the purpose of serial operation are essentially obtained by acquisition of data on at least one auxiliary output SA1 of this register R. In particular the invention enables a programmable delay buffer register to be produced very simply.

1 Claim, 2 Drawing Sheets

FIG. 3
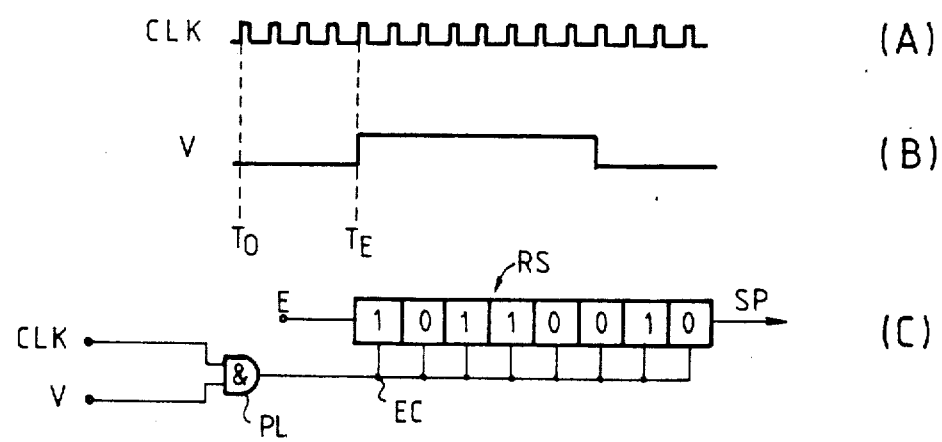
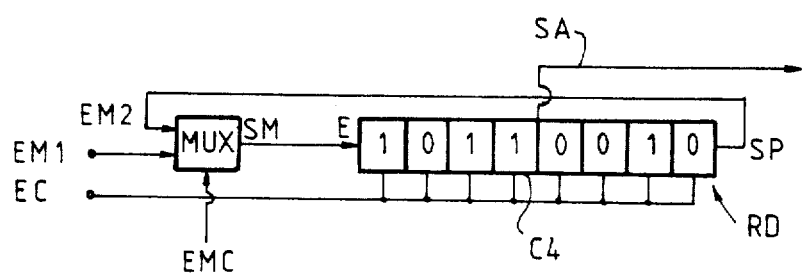
FIG. 4
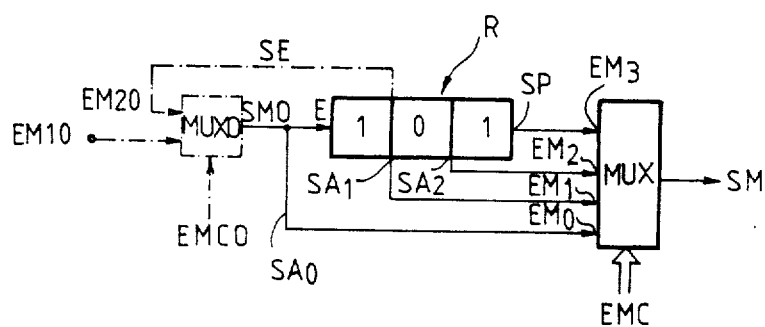
FIG. 5

PROGRAMMABLE DYNAMIC SHIFT REGISTER WITH VARIABLE SHIFT CONTROL

The present invention relates to an elementary digital data processing device, including: on the one hand a shift register of specified length composed of a number of cells corresponding to that length, arranged in series between an input and an output of this register, and each of which contains, at an initial time, one bit of an initial word the first bit of which is contained in the input cell and the last bit in the output cell; and on the other hand means of control, synchronised on this initial time to enable, counting from the start of an operational phase of the initial word, a series of relevant bits to be available, as an output of the register, including at least some of the successive bits forming this initial word, with a certain time shift with respect to the initial time and/or starting from a relevant bit having a certain spatial shift, according to the length of the register, with respect to the last bit of the initial word, these means of control including a clock producing pulses at the frequency of which the bits progress from one cell to the next in the direction of the output of the register.

Shift registers are well known elements and their use is extremely frequent and practically indispensable in serial type data processing circuits.

It is the practice to distinguish, in complex data processing circuits, an arithmetic and logic unit, data registers and a control unit. Basically the arithmetic and logic unit produces combinations of binary data, the registers perform temporary data storage, time divisions, concatenations and/or shifts, and the control unit provides the time organisation of the various elementary operations.

In serial type logics the registers exchange, bit by bit, digital data with the arithmetic and logic unit, under the control of the control unit.

The control unit includes in particular a clock producing primary pulses at a fixed basic frequency, as well as frequency dividers producing scondary clock pulses at the basic frequency divided by a power of 2, and combinative circuits with logic gates which deliver, based on the primary and secondary clock pulses, control signals which are more or less complex having between them various phase shifts and to which are allocated specified control functions. The lengths of the various registers are often equal to each other, and for example equal to 8, or at least often represented by a power of 2.

Each bit of a binary word contained in a shift register represents a specified value at a specified time, and this value can be modified at a following time, in particular by a shifting of the word in the register, controlled by the control unit.

However, as on the one hand there is no a priori relationship between the length of the registers, which depends on the accuracy or on the required computing power, and the amplitudes of the shifts to be produced, which depend on the nature of the digital operations to be carried out, and as on the other hand the output data of a shift register are only available in series, the control signals given out by the control unit must be produced in such a way as to take account both of the length of the registers and of the shifts to be carried out for each of the registers.

The result of this is on the one hand that the control unit must contain, practically for each shift register, a combinative circuit for producing the control signals for that register, and on the other hand that this combinative circuit can have a relatively complex structure, particularly when the amplitude of the shift to be carried out does not correspond with a number of clock pulses represented by a power of 2.

In this context, the purpose of the present invention is to propose an elementary data processing device capable of shifting digital data either in space, i.e. by a change of position, or in time, i.e. by a delay, with means of control as simple as possible. For this purpose, the device of the invention, which includes on the one hand a shift register of specified length composed of a number of cells corresponding to that length, arranged in series between an input and an output of this register, and each of which contains, at an initial time, a bit of an initial word the first bit of which is contained in the input cell and the last bit in the output cell; and on the other hand means of control to mark this initial time and to enable, counting from the start of an operational phase of the initial word, a series of relevant bits to be available, as an output of the register, including at least some of the successive bits forming this initial word, with a certain time shift with respect to the nnitial time and/or starting from a relevant bit having a certain spatial shift, according to the length of the register, with respect to the last bit of the initial word, these means of control including a clock producing pulses at the frequency of which the bits progress from one cell to the next in the direction of the output of the register, is essentially characterised in that these means of control include at least one auxiliary register output, on which is acquired the series of relevant bits, the time control to be achieved in order to take account of the said time shift and/or of the said spatial shift being essentially produced by the branch connection of this auxiliary output to the register at the level of the cell which contains, or is intended to contain, at the start of the operational phase, the last bit of the series of relevant bits, which is the first to be acquired.

Among all the forms which the device of the invention can take, three specific forms develop particularly important advantages.

In a first specific embodiment, the device of the invention includes in addition a second shift register the input of which is connected to an auxiliary output of the first register, and this second register, which is intended to contain in its last cell, at the end of the operational phase of the initial word contained in the first register at the initial time, the last relevant bit of this initial word, has a length equal to that of the first register, the end of the said operational phase being thus marked from the said initial time by the elapsing of a time corresponding to the appearance of a number of clock pulses equal to the number of cells of each of these first and second registers.

The frequency dividers and combinative circuits forming part of the control unit are thus greatly simplified insofar as it is sufficient for these circuits to take account only of the lengths of the registers, which are generally equal to each other and represented by a power of 2.

In a second particular embodiment, which can be used in the case in which the start of the operational phase of the initial word is separated from the initial time by a time interval corresponding to the appearance of a number of clock pulses having, with respect to the closest multiple of the number of cells in this register, a difference representing a certain time shift, the shift register is a dynamic register looped back on itself by the connection of its main output with its input, in such a way as to enable a continuous recirculation of the digital data which it contains, and the auxiliary output of this register is separated from the input or from the output of the register by a number of cells equal to the number of clock pulses representing the said time shift.

With such an embodiment, the required digital data are available at the required time on the auxiliary output of the register without it being necessary to provide any combinative circuit whatsoever for marking the time at which the output data of the register are relevant, i.e. form the required data.

In a third particular embodiment of the invention, the device includes, in addition to the shift register, a controllable multiplexer with at least two inputs and one output, this output being able to be selectively connected, depending on a control signal applied to this multiplexer, to any one of its inputs, this multiplexer being, by its inputs, connected to at least two respective outputs of the shift register, at least one of which is an auxiliary output.

Due to this arrangement, the device then constitutes, between the input of the shift register and the output of the multiplexer, for a flow of digital data applied to the input of the shift register, a buffer register introducing into this data flow a programmable delay, determined by the value of the said control signal.

The device of the invention is particularly applicable to data processing units with specific uses and with simpe programming, such as for example programmable digital filters.

A more particular application still is that of programmable digital band-pass filters based on second order filtering cells and suitable for use in centralised remote control receivers.

Figure 2:
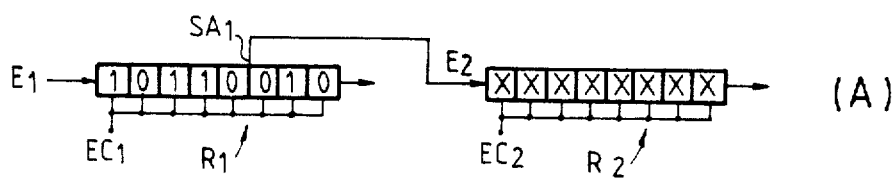
Figure 2:
Figure 2:
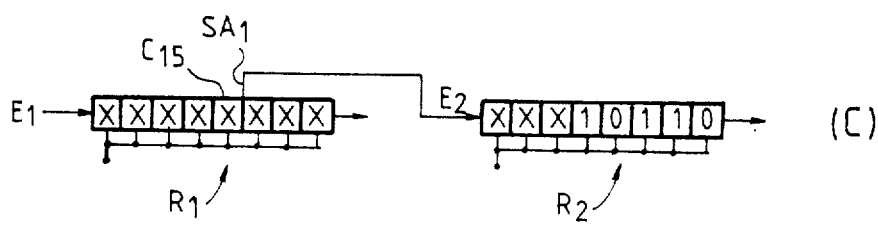

The three particular embodiments of the invention previously mentioned are described hereafter, as an indication and in no way limiting, with reference to the appended drawings, among which:

FIG. 1, formed of FIGS. 1A to 1C, represents the control of two shift registers according to the prior art for the purpose of obtaining a spatial data shift, and these two registers before and after control, FIG. 2, formed of FIGS. 2A to 2C, represents the control of two shift registers according to the invention for the purpose of obtaining a spatial data shift, and these two registers before and after control, FIG. 3, composed of FIGS. 3A, 3B and 3C, represents a shift register and its control, according to the prior art, for the purpose of obtaining a data time shift, FIG. 4 represents a shift register producing a data time shift according to the technique of the invention, FIG. 5 is a programmable shifting unit depending on the technique of the invention.

FIG. 1A represents two conventional shift registers R1 and R2, including inputs E1 and E2 and main outputs SP1 and SP2 respective, the input E2 of the second register R2 being connected to the output SP1 of the first register R1.

Each register is formed by a succession of flip-flops, such as C11, C15, C18, C21 and C28, which can be considered as elementary memory cells intended for the storage of one bit of the binary word contained, at a given time, in the register. At the initial time, represented by FIG. 1A, the register R1 contains the binary word 10110010 and the register R2 contains a binary word, relevant or not relevant to the calculations to be caried out, but irrelevant to the present description, and symbolised by XXXXXXXX.

The shift registers R1 and R2 are controlled in a well-known way by the application, on their respective control inputs EC1 and EC2, of a common clock signal CLK coming from a clock (not shown).

On each clock signal pulse, the bits of the words contained in the registers are transferred from one cell to the next in the directions of the respective main outputs SP1 and SP2 of these registers. Because of the connection existing between the output SP1 of the first register and the input E2 of the second register, the bits pushed out of the output of the first register are retrieved in the first cell C21 of the second register. The bits received at input E1 of the first register are relevant or not relevant with respect to the calculations to be carried out but are irrelevant to the present description, and are represented by X. R1 can, as is known in itself, be preceded by a sign extension multiplexer, capable of copying the bit contained at the initial time in the first cell C11.

Under these conditions, if the calculations require that the successive bits 1, 0, 1, 1, 0, which are contained in cells C11 to C15 of register R1 at the initial time, and which are for example the only bits relevant to the rest of the digital processing, are available one after the other, counting from the start of an operational phase of the binary word "10110010", in order to be finally placed, at the end of this operational phase, in the cells C24 to C28 of register R2, the control of registers R1 and R2 will require the application of 11 clock pulses as shown in FIG. 2B. Now the production of these 11 clock pulses implies relatively complex means. If we let F be the frequency of the clock pulses CLK, we will for example have to provide for the production of a signal W at a frequency of F/16, of a signal X at a frequency of F/8, of a signal Y at a frequency of F/4, of a signal Z at a frequency of F/2 and the 11 clock pulses will for example be produced by a combinative circuit carrying out the Boolean function:

CLK AND (W OR((X AND Y) OR (X AND Z))).
FIG. 2 represents the means of the invention, which enable the same result to be achieved much more simply.

In FIGS. 2A and 2C we again find the registers R1 and R2 illustrated in FIG. 2. However, instead of the input E2 of the second register being connected to the main output SP1 of the first register, this input E2 is connected to an auxiliary output SA1 of the first register; this auxiliary output SA1 is branch connected to register R1 at the level of cell C15 which contains, at the start of the operational phase of the initial binary word 10110010, the last relevant bit, namely the last bit of the series 10110 which is used for the rest of the calculations. This last bit, which is therefore the first to be acquired at the start of the operational phase, is thus directly transferred into register R2 on the appearance of the first clock pulse.

The result of this is that, as shown in FIG. 2B, the passage of the configuration of FIG. 2A into the configuration of FIG. 2C can no longer be achieved by means of 11 clock pulses, but by means of 8 clock pulses, in other words by a number of clock pulses equal to the number of cells of each of the registers R1 and R2. As this number is itself chosen, in the conventional way, to be equal to a power of 2 (generally equal to 8) the control of these registers is significantly facilitated. Thus, again taking the notations given above, the control signal of FIG. 2B is expressed by the simple Boolean combination: CLK AND W, and thus applies no matter what shift we wish to achieve, i.e. no matter what may be the position of the auxiliary output SA1 on register R1.

FIG. 3 represents a static shift register RS containing a binary word "10110010" which, with respect to a phenomenon occurring at an initial time To, must be delayed such that it is only available, bit after bit, after a time TE, later than To and marking the start of an operational phase of this intitial binary word "10110010".

By static shift register, we mean a shift register formed of D-type static flip-flops. It is in fact known that in MOS (Metal Oxide Semi-conductor) technology, D-type flip-flops can be static or dynamic, the second type differ from the first in that they are produced with half as many transistors but require a continuous refreshing of the data that they contain.

According to the prior art, represented in this FIG. 3, the required time shift (of 4 clock pulses in the example of FIG. 3) between the initial time To and the start TE of the operational phase is obtained by producing, by Boolean combination of the primary clock signal CLK and secondary clock signals which are at frequencies which are multiples of the frequency of the primary signal, an enabling signal V giving the required time shift TE-To wtth respect to To. As before, the production of this signal V can, in the general case, require relatively complex means. This signal V, combined with the clock signal CLK by means of a logic AND gate, designated by PL, is applied to the control input EC of the register RS, such that the binary word "10110010" contained in this register at the initial time To only begins to be shifted starting from time TE, and that at this time TE the bit available at the output of the register is the last bit of the initial binary word.

FIG. 4 represents the means of the invention which enable the same result to be achieved much more simply. Register RD is a dynamic register the output SP of which is, in a known way, looped back to the input E via a multiplexer MUX. The multiplexer MUX includes a recycling input EM2 connected to the output SP of the register RD, a new data input EM1, an output SM connected to the input E of the register, and a control input EMC capable of receiving a signal enabling, in a selective way, the connection of the output SM to the input EM1 for the introduction of new data into the register RD, or to the input EM2 for the recycling of the data already contained in this register. The register itself contains, as is usual, a shift timing control input EC receiving a clock signal such as the signal CLK in FIG. 3A.

The signal EMC is for example fixed, throughout the cycle represented by the 16 clock pulses illustrated in FIG. 3A, at a value such that the output SM of the multiplexer is connected to the recycling input EM2.

Under these conditions, making the initial word 10110010 available bit by bit starting at time TE is achieved simply by providing an auxiliary output SA at the level of cell C4 which, at time TE, will contain the last bit of the binary word 10110010; starting from time TE, a circuit connected to the auxiliary output SA of the register RD can therefore read the word "10110010" bit by bit starting from the last bit of this word; if L denotes the length of the register (i.e. the number of its cells), the auxiliary output SA of the register RD is separated from the input of the register by a number of cells equal to (TE-To) Modulo L where (TE-To) is the interval between times TE and To, measured as a number of clock pulses.

The arrangement would have been the same as that of FIG. 4 if, instead of using the word 10110010 to be started at time TE, we wished to use it starting from a later time, separated from TE by a number of clock pulses equal to a multiple of the number of cells in the register, for example TE+L or TE+2L, the same bit configuration recurring at all these times in the register RD for as long as that register remains looped back on itself.

In addition, the time shift between TE and To could have been fixed at a value other than that corresponding to FIG. 3b by having the auxiliary output SA at another location in the length of register RD, i.e. at the output of a cell other than cell C4.

FIG. 5 represents a device according to the invention, enabling the formation, for a serial digital data flow, of a programmable delay buffer register.

This device includes a shift register R having a data input E, a main output SP and auxiliary outputs SAO, SA1 and SA2; for purposes of clarity in the drawing, the control input EC of the register R and the associated connections have not been shown in FIG. 5; the output SAO coincides for example with the input E of this register R, and the outputs SAO to SP are connected to the respective inputs EMO to EM3 of multiplexer MUX having, in addition to its four data inputs a control input EMC and an output SM.

The multiplexer MUX, known per se, enables, by application of an appropriate signal to its input EMC, the connection in a selective way of the output SM to any of the inputs EMO to EM3.

If the number of data inputs of the multiplexer MUX, such as EMO to EM3, is greater than 2, the control input EMC contains, as known per se, several conductors in order to enable the addressing of these data inputs by means of a signal having several bits injected in parallel on these conductors.

The result of this arrangement is that a binary digital data flow arriving at the input E of the register R can be retrieved at the output SM of the multiplexer MUX, as a function of the signal applied to the input EMC of the multiplexer, either using the path SAO-EMO, i.e. with no delay, or by using the path SA1-EM1, i.e. with a delay of one clock pulse corresp6nding to a temporary storage of each bit of the data flow in the first cell of the register (the left-hand cell), or by using the path SA2-EM2, i.e. with a delay of 2 clock pulses corresponding to the temporary storage of each bit of the data flow in the first two cells of the register, or, finally, by using the path SP-EM3, i.e. with a delay of 3 clock pulses corresponding to a temporary storage of each bit of the data flow in each of the cells of the register R. The number of cells in this register is not limited to 3, but is chosen, as will be apparent to a person skilled in the art, depending on the requirements to be satisfied.

The shift register R can, as known per se, be preceded by a sign extension multiplexer MUXO one input EM10 of which can receive new data, and another input EM20 of which is connected to a sign extension output SE provided on the first cell of the register R; this sign extension multiplexer MUXO also includes an output SMO connected to the input E of the register R and a control input EMCO whcch can receive a signal enabling the connection in a selective way of the output SMO to the input EM10 for the purpose of receiving a flow of new data, or to the input EM20 in order to replace, on the appearance of a clock pulse, the bit initially contained in the first cell of the register R with an identical bit.

We claim:

1. A data storage and delay circuit, comprising:

a shift register having an input and a main output between which is disposed a first number of cells arranged in series, each said cell containing, at an initial time, a bit of an initial word having a first bit thereof in an input cell of said register and a last bit thereof in an output cell of said register, and clock means generating clock pulses at a predetermined frequency for shifting bits stored in said register from one cell to the next in the direction of the output of the register at said predetermined frequency; and control means synchronized to said initial time to enable a series of relevant bits including at least some consecutive bits of the initial word to be available bit by bit as an output of the register, from the beginning of an exploitation phase of the initial word;

wherein the beginning of said phase is separated from the initial time by a time interval corresponding to the appearance of a predetermined number of clock pulses;

and wherein the first one of said relevant bits is contained in a predetermined cell of said register at said initial time;

said control means including at least one auxiliary register output, at which said series of relevant bits is made available;

wherein said shift register comprises a dynamic register looped back on itself only by a connection of its main output with its input so as to enable a continuous recirculation of the digital data it contains;

and wherein said auxiliary output is separated from said predetermined cell by a number of cells which is equal to said predetermined number, in the direction of the output of the register.

* * * * *